United States Patent
Schnieders et al.

(10) Patent No.: US 12,154,108 B2
(45) Date of Patent: Nov. 26, 2024

(54) METHOD AND SYSTEM FOR COMPLETING A TRANSACTION

(71) Applicant: Deutsche Telekom AG, Bonn (DE)

(72) Inventors: Dominik Schnieders, Aachen (DE); Stephan Spitz, Karlsfeld (DE); Hermann Geupel, Munich (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/868,796

(22) Filed: Jul. 20, 2022

(65) Prior Publication Data

US 2023/0027731 A1 Jan. 26, 2023

(30) Foreign Application Priority Data

Jul. 22, 2021 (EP) ...................................... 21187282

(51) Int. Cl.
*G06Q 20/40* (2012.01)
*G06Q 20/32* (2012.01)
(Continued)

(52) U.S. Cl.
CPC ........... *G06Q 20/40* (2013.01); *G06Q 20/325* (2013.01); *G06Q 20/327* (2013.01); *G06Q 20/34* (2013.01); *G06Q 20/42* (2013.01)

(58) Field of Classification Search
None
See application file for complete search history.

(56) References Cited

U.S. PATENT DOCUMENTS

| 10,445,731 B1* | 10/2019 | Dodds-Brown | ..... G06Q 20/385 |
| 2005/0027543 A1* | 2/2005 | Labrou | .................. G06Q 20/02 705/26.35 |

(Continued)

OTHER PUBLICATIONS

Wikipedia Editors: "Edge computing—Wikipedia", Online Encyclopedia Wikipedia, Jul. 13, 2021 (Jul. 13, 2021), XP055871266, Retrieved from the Internet: URL: https://en.wikipedia.org/w/index.php?title=Edge_computing&oldid=I033325022 [retrieved on Dec. 9, 2021], the whole document.

*Primary Examiner* — Matthew S Gart
*Assistant Examiner* — Tony P Kanaan
(74) *Attorney, Agent, or Firm* — LEYDIG, VOIT & MAYER, LTD.

(57) ABSTRACT

A method for completing a transaction includes: a backend server executes an application backend of a transaction application; a first terminal device executes a first application frontend of the transaction application; the first application frontend, for starting a transaction, transmits a transaction request indicating the transaction to be started and a second application frontend different from the first application frontend and comprising transaction data associated with the indicated transaction to the application backend; a second terminal device executes the second application frontend of the transaction application; the application backend provides a transaction link for being connected to by the second application frontend and transmits an authorization request to the second application frontend; the second application frontend authorizes the requested transaction and transmits a transaction authorization to the application backend; and the application backend completes the transaction.

13 Claims, 1 Drawing Sheet

(51) Int. Cl.
*G06Q 20/34* (2012.01)
*G06Q 20/42* (2012.01)

(56) References Cited

U.S. PATENT DOCUMENTS

| | | | | |
|---|---|---|---|---|
| 2012/0158589 | A1* | 6/2012 | Katzin | G06Q 20/22 |
| | | | | 705/44 |
| 2012/0310826 | A1* | 12/2012 | Chatterjee | G06Q 20/36 |
| | | | | 705/41 |
| 2013/0013499 | A1* | 1/2013 | Kalgi | G06Q 20/386 |
| | | | | 705/41 |
| 2013/0066782 | A1 | 3/2013 | Diamond | |
| 2013/0144785 | A1* | 6/2013 | Karpenko | G06Q 20/425 |
| | | | | 705/44 |
| 2013/0268378 | A1 | 10/2013 | Yovin | |
| 2014/0006184 | A1* | 1/2014 | Godsey | G06Q 20/3276 |
| | | | | 705/16 |
| 2014/0249999 | A1* | 9/2014 | Johnson | G06Q 20/20 |
| | | | | 705/39 |
| 2014/0297533 | A1* | 10/2014 | Mittal | G06Q 20/3224 |
| | | | | 705/44 |
| 2016/0019536 | A1* | 1/2016 | Ortiz | G06Q 20/36 |
| | | | | 705/67 |
| 2016/0092874 | A1* | 3/2016 | O'Regan | G06Q 20/3221 |
| | | | | 705/44 |
| 2016/0210626 | A1* | 7/2016 | Ortiz | G06Q 20/12 |
| 2017/0017958 | A1* | 1/2017 | Scott | G06Q 20/40 |
| 2017/0249622 | A1* | 8/2017 | Ortiz | G06Q 20/351 |
| 2017/0262848 | A1* | 9/2017 | Bernstein | G06Q 20/40 |
| 2017/0316405 | A1* | 11/2017 | Lonni | G06Q 20/3674 |
| 2017/0330181 | A1* | 11/2017 | Ortiz | G06Q 20/12 |
| 2018/0268418 | A1* | 9/2018 | Tanksali | G06Q 30/012 |
| 2019/0019171 | A1* | 1/2019 | Silvestre | G06Q 20/385 |
| 2019/0295077 | A1* | 9/2019 | Mardikar | G06Q 20/401 |
| 2020/0019961 | A1* | 1/2020 | Silvestre | G06Q 20/385 |
| 2021/0319444 | A1* | 10/2021 | Williams | G06Q 20/3825 |
| 2022/0020016 | A1* | 1/2022 | Scott | G06Q 20/023 |
| 2023/0334491 | A1* | 10/2023 | Leddy, III | G06Q 20/401 |

* cited by examiner

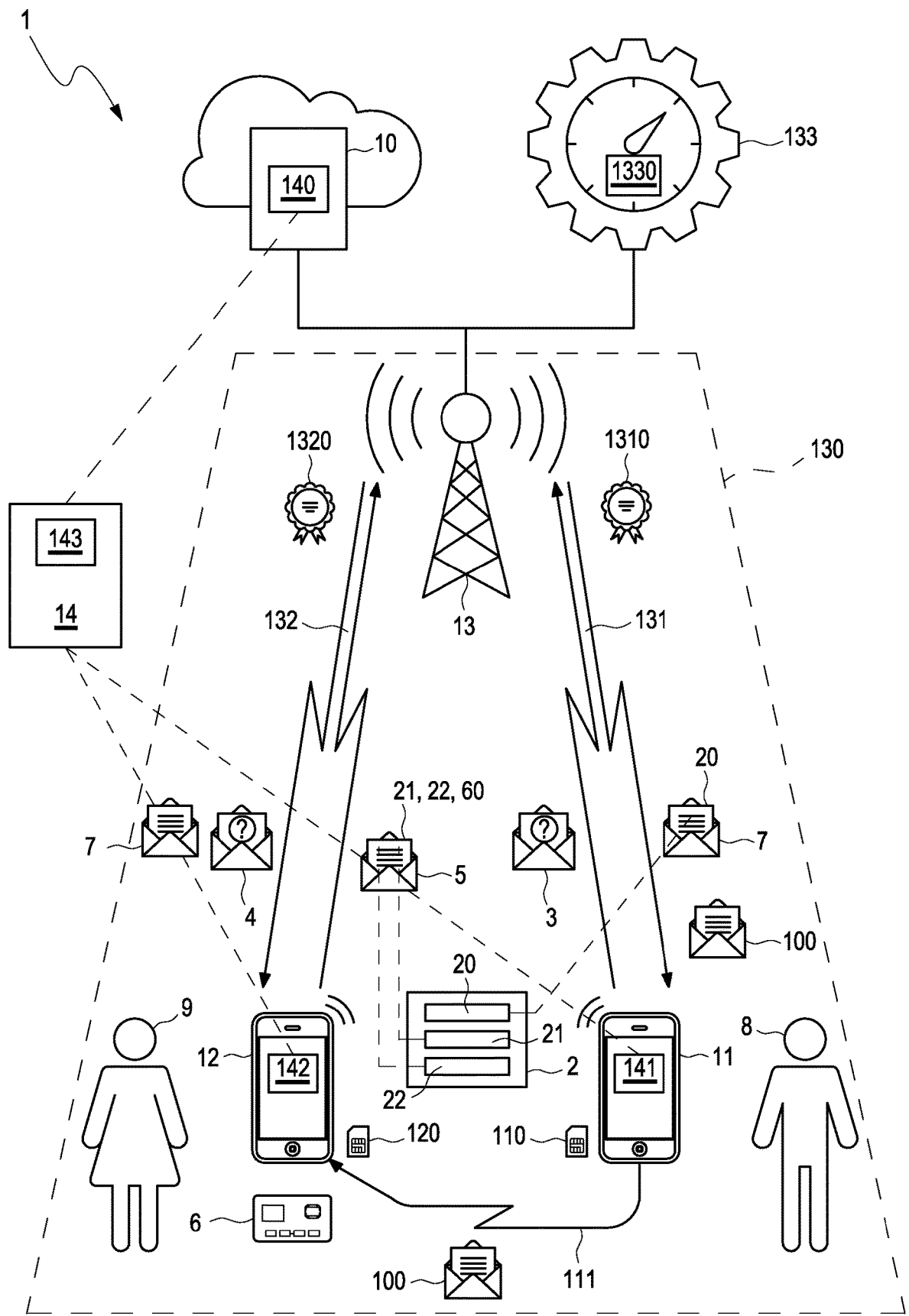

METHOD AND SYSTEM FOR COMPLETING A TRANSACTION

CROSS-REFERENCE TO PRIOR APPLICATIONS

This application claims benefit to European Patent Application No. EP 21 187 282.5, filed on Jul. 22, 2021, which is hereby incorporated by reference herein.

FIELD

The invention relates to a method for completing a transaction. The method comprises the following steps: a backend server connected to a communication network executes an application backend of a transaction application; a first terminal device connected to the communication network via a first connection executes a first application frontend of the transaction application; the first application frontend, for starting a transaction, transmits a transaction request indicating the transaction to be started and comprising transaction data associated with the indicated transaction to the application backend via the first connection; and the application backend, upon receipt of a transaction authorization, completes the transaction. Furthermore, the invention relates to a system for completing a transaction.

BACKGROUND

A transaction application is used for completing a transaction (e.g. a payment), and usually comprises an application backend to be installed in a backend server and an application frontend to be installed in a terminal device. Both the application backend and the application frontend may be implemented as a software program product.

During normal operation of the transaction application, the application backend is executed by a backend server and the application frontend is executed by a terminal device arranged remote from the backend server. The backend server and the terminal device are both connected to a communication network providing the application backend and the application frontend with a connection for communicating with each other.

The application frontend is assigned to and configured for a particular user (e.g. a dealer). For completing a transaction, the user provides the application frontend with transaction data. The transaction data may be automatically provided by an electronic point-of-sale (POS) system connected to the terminal device or manually provided by the user operating a human machine interface of the terminal device (e.g. by hitting a keypad of the terminal device or by touching a keypad displayed by a touchscreen of the terminal device). The transaction data to be provided at least comprises a transaction amount (e.g. an amount of money corresponding to a price of a product to be sold).

When the application frontend is provided with the transaction data, a further user (e.g. a customer) is required to check the provided transaction data, to provide further transaction data (e.g. data indicating an account to be debited), and to authorize the transaction. The further user may provide a transaction device comprising the further transaction data (e.g. a payment card or a further terminal device) for being read by the terminal device, and additionally provide a personal key (e.g. a personal identification number (PIN)) by operating the human machine interface of the terminal device (e.g. by hitting a keypad of the terminal device or by touching a keypad displayed by a touchscreen of the terminal device).

When the provided personal key matches the transaction device the application frontend considers the transaction to be authorized and transmits a transaction request indicating the transaction and comprising the transaction data, the further transaction data and a corresponding transaction authorization to the application backend which completes the transaction.

As described above, the further user has to have his transaction device read by the terminal device and to operate the terminal device for authorizing the transaction. On the one hand, the further user may suffer from a certain discomfort or anxiety in presenting sensitive account data and the personal key to the terminal device (i.e. a foreign device). On the other hand, the further user may be afraid of becoming infected via the terminal device which is indeed operated (i.e. immediately contacted) by a plurality of further users (e.g. the dealer and other customers). These shortcomings may reduce a wide acceptance of such methods and systems for completing a transaction.

SUMMARY

In an exemplary embodiment, the present invention provides a method for completing a transaction. The method includes: a backend server connected to a communication network executes an application backend of a transaction application; a first terminal device connected to the communication network via a first connection executes a first application frontend of the transaction application; the first application frontend, for starting a transaction, transmits a transaction request indicating the transaction to be started and a second application frontend different from the first application frontend and comprising transaction data associated with the indicated transaction to the application backend via the first connection; a second terminal device different from the first terminal device and connected to the communication network via a second connection different from the first connection executes the second application frontend of the transaction application; the application backend, upon receipt of the transaction request, provides a transaction link for being connected to by the second application frontend and, upon being connected to by the second application frontend, transmits an authorization request to the second application frontend via the second connection; the second application frontend, upon receipt of the authorization request, authorizes the requested transaction and transmits a transaction authorization to the application backend via the second connection; and the application backend, upon receipt of the transaction authorization, completes the transaction.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 schematically shows an entity diagram of a system according to the invention for completing a transaction.

DETAILED DESCRIPTION

Exemplary embodiments of the invention provide a method for completing a transaction which provides safe protection of both sensitive data and health. Exemplary embodiments of the invention further provide a system for completing a transaction.

A first aspect of the invention is a method for completing a transaction, wherein the method comprises the steps: a backend server connected to a communication network executes an application backend of a transaction application; a first terminal device connected to the communication network via a first connection executes a first application frontend of the transaction application; the first application frontend, for starting a transaction, transmits a transaction request indicating the transaction to be started and comprising transaction data associated with the indicated transaction to the application backend via the first connection; and the application backend, upon receipt of a transaction authorization, completes the transaction. The transaction application is a distributed application with an application backend and an application frontend which are executed on different devices arranged remote from each other, i.e. the backend server and the terminal device, respectively.

The terminal device may be a dedicated terminal device or a general terminal device (e.g. a smartphone or the like), which is operated by a user (e.g. a dealer). The application backend and the application frontend communicate with each other via the connection provided by the communication network. The application backend completes the transaction upon receipt of both the transaction request and the transaction authorization. While the transaction request comprises transaction data required for completing the transaction (e.g. an amount of money corresponding to a price of a product or account data), the transaction authorization is caused by a personal key (e.g. a personal identification number (PIN)), which is correctly provided by a further user (e.g. a customer buying the product from the dealer).

According to the invention, the transaction request indicates a second application frontend different from the first application frontend; a second terminal device different from the first terminal device and connected to the communication network via a second connection different from the first connection executes the second application frontend of the transaction application; the application backend, upon receipt of the transaction request, provides a transaction link for being connected to by the second application frontend and, upon being connected to by the second application frontend, transmits an authorization request to the second application frontend via the second connection; the second application frontend, upon receipt of the authorization request, authorizes the requested transaction and transmits the transaction authorization to the application backend via the second connection. The transaction application, hence, comprises the second application frontend to be executed by the second terminal device (e.g. a smartphone).

The transaction link enables the second application frontend to connect to the application backend and comprises address data of the application backend (e.g. an IP address and/or a port number of the application backend), a unique transaction ID and/or further data for establishing the connection (e.g. authentication data or an encryption key or a security certificate). The transaction link may be configured to be a quick respond (QR) code, a beacon or the like.

The further user enables and authorizes the transaction by exclusively operating the second terminal device. In other words, the first terminal device is not involved in enabling and authorizing the transaction. As a consequence, sensitive data provided by the further user is safely protected against a fraud, and health of the further user is safely protected against an infection possibly caused by the first terminal device.

Preferably, providing the transaction link comprises generating the transaction link and transmitting the transaction link to the first application frontend. The second application frontend, does not receive the transaction link immediately. As a consequence, the second terminal device is not involved in the transaction to be completed resulting in a further reduced risk of fraud.

The first application frontend, upon receipt of the transaction link, preferably transfers the received transaction link to the second application frontend via a contactless short range transmission different from the first connection and the second connection. The contactless short range transmission depends on the format of the transaction link. When the transaction link is configured to be a QR code, the contactless short range transmission requires a visual display of the first terminal device to display the QR code and a camera of the second terminal device to capture the displayed QR code. When the transaction link is configured to be beacon, the contactless short range transmission requires the first application frontend to transmit the beacon via a radio connection according to a wireless protocol, e.g. a Bluetooth protocol or an NFC protocol, and the second application frontend to receive the beacon according to the respective protocol.

In these embodiments, the second application frontend, upon receipt of the transaction link, may connect to the application backend using the transaction link and causing the application backend to transmit the authorization request. The second application frontend extracts address data of the application backend (e.g. an IP address and/or a port number of the application backend), a unique transaction ID and/or further data for establishing the connection (e.g. authentication data or an encryption key or a security certificate) from the transaction link and uses the address data for connecting the application backend.

In many embodiments, authorizing the requested transaction comprises reading further transaction data from a transaction device separate from the second terminal device and arranged close to the second terminal device and adding the read transaction data to the transaction authorization and/or completing the transaction comprises transmitting a transaction confirmation to the first application frontend and/or to the second application frontend. The separate transaction device is exclusively presented to the second terminal device. Therefore, the first terminal device is excluded from reading the further transaction data, e.g. account data of the customer, or a personal key of the further user. The transaction device may be wirelessly read by the second terminal device using near field communication (NFC) or Bluetooth.

The transaction confirmation indicates a success of the transaction or an error preventing a success of the transaction. The transaction confirmation may be transmitted to the first terminal device and/or the second terminal device via a messaging service of the communication network (e.g. short message service (SMS)).

Preferably, authorizing the requested transaction comprises reading account data as the further transaction data and authorization data from a credit card or a debit card as the transaction device and a payment is completed as the transaction. Credit cards and debit cards are used by a plurality of further users and, hence, are particularly important transaction devices to be supported for improving an acceptance and extending an application of the method.

In a preferred embodiment, an edge cloud server located close to both the first terminal device and the second terminal device executes the application backend as the backend server. The edge cloud server is arranged in a vicinity (i.e. in a spatial vicinity and/or in a logical vicinity) of the first terminal device and the second terminal device and, hence, allows for a particularly low round trip time (RTT) in completing the transaction which further increases acceptance of the method.

Still preferably, the transaction application is operated using a cellular network as the communication network and the edge cloud server is located close to a radio cell of the cellular network the first terminal device and the second terminal device are arranged in. The cellular network allows for carrying out the method practically at any place and, hence, strongly improves applicability of the method. Apart from that, protection against fraud may be improved by the method explicitly requiring the first terminal device and the second terminal device to be simultaneously arranged within the same radio cell (i.e. to be very close to each other), thus guaranteeing an immediate consent of the user and the further user about the transaction to be completed.

A quality service of the communication network may advantageously apply a respective predetermined service quality to the first connection and/or the second connection. The predetermined service quality (e.g. a quality of service (QoS)) may comprise a maximum latency and/or a minimum bitrate, particularly a low maximum latency and/or a high bitrate, which accelerate the completion of the transaction and, at the same time, may effectively reduce a jitter of the first connection and/or the second connection. The predetermined service quality allows for a short response time when completing the transaction which further increases the acceptance of the method. The quality service is a service of the communication network for managing the service quality (e.g. the maximum latency and/or the minimum bitrate) of connection provided by the communication network, particularly of the first connection and/or of the second connection. For instance, the quality service may communicate with the application backend, the first application frontend and/or the second application frontend in order to adjust the service quality adequate for a constellation and/or an actual load of the communication network.

The predetermined service quality may be applied dependent of a subscriber identity provided by a subscriber identity module of the first terminal device and/or the second terminal device. The subscriber identity modules (SIM) of the first terminal device and/or the second terminal device define the respective service qualities the user and/or the further user are paying for.

Additionally or alternatively, the respective predetermined service quality may be applied dependent of a unique quality identifier provided by the first application frontend and/or the second application frontend. The first application frontend and the second application frontend provide the unique quality identifier to the quality service which adjusts the service quality dependent of the unique quality identifier. Thus, the unique quality identifier may cause the quality service to provide the first connection and/or the second connection even with a higher service quality than paid for by the user and the further user, respectively. Accordingly, the response time for completing the transaction may even be shorter than paid for by the user and/or the further user.

In an advantageous embodiment, the predetermined service quality is applied dependent of a transaction application ID of the transaction application, an access point name (APN)/data network name (DNN) or a combination comprising an (internet protocol) IP address and a port number as the unique quality identifier. The transaction application ID may be registered in advance and is accessible for the quality service. For instance, an entry of a registration database may assign the service quality to the application ID. The APN/DNN and the combination comprising the IP address and the port number involved in operating the transaction application are communication characteristics known by the communication network and, thus, accessible for the quality service.

The first application frontend may store the unique quality identifier. In other words, the user requesting the transaction statically defines the service quality to be applied to the first connection and/or the second connection.

The second application frontend may store the unique quality identifier. In other words, the further user authorizing the transaction statically defines the service quality to be applied to the first connection and/or the second connection.

Alternatively, the first application frontend causes the application backend to generate the unique quality identifier and to transmit the generated unique quality identifier to the second application frontend. In other words, the service quality to be applied to the first connection and/or the second connection is defined dynamically. The application backend, thereby, may communicate with the quality service and take into account a constellation and/or an actual load of the communication network.

Preferably, the second application frontend stores additional transaction data for completing the transaction and adds the transitional transaction data to the transaction authorization. The additional transaction data may comprise an e-mail address defining where a transaction record (e.g. a bill) is to be sent when completing the transaction. Storing the additional transaction data relieves the further user from repeatedly providing the additional transaction data for each transaction to complete. Hence, comfort and acceptance of the method is further increased.

In favorable embodiments, the first application frontend authenticates a user of the first terminal device. Authenticating the user (e.g. the dealer) increases safety of the method which results in further increased acceptance of the method.

Another aspect of the invention is a system for completing a transaction, comprising a transaction application, a first terminal device, a first application frontend of the transaction application to be executed by the first terminal device, a second terminal device, a second application frontend of the transaction application to be executed by the second terminal device, a backend server, an application backend of the transaction application to be executed by the backend server and a communication network for connecting the first terminal device, the second terminal device and the backend server. As the system comprises a backend server and two terminal devices (e.g. smartphones or the like) and a transaction application (e.g. implemented as a software program product) distributed among the three devices, there is a plurality of possible applications of the invention.

The system may be created by simply installing the application backend, the first application frontend and the second application frontend on the backend server, the first terminal device and the second terminal device, respectively.

According to the invention, the first terminal device, the first application frontend, the second terminal device, the second application frontend, the application backend and the communication network are configured for together carrying out a method according to the invention. Due to the configuration, the involved devices together provide a method for completing the transaction safely (i.e. protecting both sensitive data and health of a further user).

It is an advantage of the invention that the further transaction data, the authorization and, eventually, additional transaction data are provided by a second terminal device which is different from the first terminal device. The method, hence, enables the further user operating the second terminal device to avoid both presenting sensitive data and a personal key to the first terminal device and operating the first terminal device at all. As a consequence, sensitive data of the further user is safely protected against fraud, and health of the further user is safely protected against infection which results in increased acceptance of the method.

Further advantages and configurations of the invention become apparent from the following description and the enclosed drawings.

It shall be understood that the features described previously and to be described subsequently may be used not only in the indicated combinations but also in different combinations or on their own without leaving the scope of the present invention.

The invention is described in detail by means of two exemplary embodiments and with reference to the drawings. Like components are indicated by like reference numerals throughout the drawings.

FIG. 1 schematically shows an entity diagram of a system 1 according to the invention for completing a transaction 2. The system 1 comprises a transaction application 14, a first terminal device 11, a first application frontend 141 of the transaction application 14 to be executed by the first terminal device 11, a second terminal device 12, a second application frontend 142 of the transaction application 14 to be executed by the second terminal device 12, a backend server 10, an application backend 140 of the transaction application 14 to be executed by the backend server 10 and a communication network 13 for connecting the first terminal device 11, the second terminal device 12 and the backend server 10, wherein the first terminal device 11, the first application frontend 141, the second terminal device 12, the second application frontend 142, the backend server 10, the application backend 140 and the communication network 13 are configured for together carrying out the following method (i.e. for executing the following steps).

The backend server 10 connected to the communication network 13 executes the application backend 140 of the transaction application 14. An edge cloud server located close to both the first terminal device 11 and the second terminal device 12 preferably executes the application backend 140 as the backend server 10. When the transaction application 14 is operated using a cellular network as the communication network 13, the edge cloud server may be located close to a radio cell 130 of the cellular network the first terminal device 11 and the second terminal device 12 are arranged in.

The first terminal device 11 connected to the communication network 13 via a first connection 131 executes the first application frontend 141 of the transaction application 14. The first application frontend 141 may authenticate a user 8 (e.g. a dealer) of the first terminal device 11.

The first application frontend 141, for starting the transaction 2, transmits a transaction request 3 indicating the transaction 2 to be started and the second application frontend 142 different from the first application frontend 141 and comprising transaction data 20 (e.g. an amount of money corresponding to a price of a product) associated with the indicated transaction 2 to the application backend 140 via the first connection 131.

The second terminal device 12 different from the first terminal device 11 and connected to the communication network 13 via a second connection 132 different from the first connection 131 executes the second application frontend 142 of the transaction application 14. The second terminal device 12 may be operated by a further user 9 (e.g. a customer).

A quality service 133 of the communication network 13 preferably applies a respective predetermined service quality 1310, 1320 to the first connection 131 or the second connection 132.

The predetermined service quality 1310, 1320 may be applied dependent on a subscriber identity provided by a subscriber identity module 110, 120 of the first terminal device 11 and the second terminal device 12, respectively.

The respective predetermined service quality 1310, 1320 is preferably applied dependent of a unique quality identifier 1330 provided by the first application frontend 141 and/or the second application frontend 142.

The predetermined service quality 1310, 1320 may be exemplarily applied dependent of a transaction application ID 143 of the transaction application 14, an access point name (APN)/data network name (DNN) or a combination comprising an interne protocol (IP) address and a port number as the unique quality identifier 1330.

The first application frontend 141 may store the unique quality identifier 1330. The second application frontend 142 may store the unique quality identifier 1330.

Alternatively, the first application frontend 141 may cause the application backend 140 to generate the unique quality identifier 1330 and to transmit the generated unique quality identifier 1330 to the second application frontend 142.

The application backend 140, upon receipt of the transaction request 3, provides a transaction link 100 for being connected to by the second application frontend 142. The transaction link 100 comprises address data of the application backend 140, e.g. an IP address and/or a port number of the application backend, a unique transaction ID and/or further data for establishing the connection, e.g. authentication data or an encryption key or a security certificate. The transaction link 100 may be configured to be a quick respond (QR) code, a beacon or the like.

Providing the transaction link 100 may comprise generating the transaction link 100 and transmitting the transaction link 100 to the first application frontend 141. The first application frontend 141, upon receipt of the transaction link, preferably transfers the received transaction link 100 to the second application frontend 142 via a contactless short range transmission 111 different from the first connection 131 and the second connection 132. Depending on the configuration of the transaction link 110, the contactless short range transmission 111 may be a camera capture of a visual display or a radio connection according to wireless protocol (e.g. a Bluetooth protocol or an near field communication (NFC) protocol).

The second application frontend 142, upon receipt of the transaction link 100, connects to the application backend 140 using the transaction link 100 and causing the application backend 140 to transmit an authorization request 4.

The application backend 140, upon being connected to by the second application frontend 142, transmits the authorization request 4 to the second application frontend 142 via the second connection 132.

The second application frontend 142, upon receipt of the authorization request 4, authorizes the requested transaction 2 (e.g. by requiring a personal key like a personal identification number (PIN) of the further user 9) and transmits a transaction authorization 5 to the application backend 140 via the second connection 132. Authorizing the requested transaction 2 may comprise reading further transaction data 60 from a transaction device 6 (e.g. a credit card or a debit card of the further user 9) separate from the second terminal device 12 and arranged close to the second terminal device 12 and adding the read further transaction data 60 to the transaction authorization 5 and/or completing the transaction 2 comprises transmitting a transaction confirmation 7 to the first application frontend 141 and/or to the second application frontend 142. The transaction device 6 may be provided by the further user 9.

Authorizing the requested transaction 2 may also comprise reading account data as the further transaction data 21 and authorization data 60 from a credit card or a debit card as the transaction device 6.

The second application frontend 142 may store additional transaction data 22 for completing the transaction 2 and add the additional transaction data 22 to the transaction authorization 5.

The application backend 140, upon receipt of the transaction authorization 5, completes the transaction 2. When a credit card or a debit card is used as the transaction device 6, a payment is completed as the transaction 2.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

1 system
10 backend server
100 transaction link
11 first terminal device
110 subscriber identity module
111 short range transmission
12 second terminal device
120 subscriber identity module
3 communication network
130 radio cell
131 first connection
1310 service quality
132 second connection
1320 service quality
133 quality service
1330 unique quality identifier
14 transaction application
140 application backend
141 first application frontend
142 second application frontend
143 application ID
2 transaction
20 transaction data
21 further transaction data
22 additional transaction data
3 transaction request
4 authorization request
5 transaction authorization
6 transaction device
60 authorization data
7 transaction confirmation
8 user
9 further user

The invention claimed is:

1. A method for completing a transaction, comprising:
a backend server connected to a communication network executes an application backend of a transaction application;
a first terminal device connected to the communication network via a first connection executes a first application frontend of the transaction application, wherein the first terminal device corresponds to a dealer;
the first application frontend, for starting a transaction, transmits a transaction request to the application backend via the first connection, wherein the transaction request indicates the transaction to be started, indicates a second application frontend different from the first application frontend, and comprises transaction data associated with the indicated transaction;
a second terminal device executes the second application frontend of the transaction application, wherein the second terminal device is different from the first terminal device and is connected to the communication network via a second connection different from the first connection, and wherein the second terminal device corresponds to a customer;
the application backend, upon receipt of the transaction request, provides a transaction link for connecting the second application frontend to the application backend, wherein the transaction link comprises address data of the application backend, a unique transaction ID and/or further data for connecting to the application backend, wherein providing the transaction link comprises generating the transaction link and transmitting the transaction link to the first application frontend;
the first application frontend, upon receipt of the transaction link, transfers the received transaction link to the second application frontend via a contactless, unidirectional short range transmission different from the first connection and the second connection;
the application backend, upon being connected to by the second application frontend using the transaction link, transmits an authorization request to the second application frontend via the second connection;

the second application frontend, upon receipt of the authorization request, authorizes the requested transaction and transmits a transaction authorization to the application backend via the second connection; and the application backend, upon receipt of the transaction authorization, completes the transaction.

2. The method according to claim 1, wherein the second application frontend, upon receipt of the transaction link, connects to the application backend using the transaction link and causing the application backend to transmit the authorization request.

3. The method according to claim 1, wherein authorizing the requested transaction comprises:

reading further transaction data from a transaction device separate from the second terminal device and arranged close to the second terminal device; and adding the read further transaction data to the transaction authorization; and/or wherein completing the transaction comprises transmitting a transaction confirmation to the first application frontend and/or to the second application frontend.

4. The method according to claim 3, wherein authorizing the requested transaction comprises reading account data as the further transaction data and authorization data from a credit card or a debit card as the transaction device, and wherein a payment is completed as the transaction.

5. The method according to claim 1, wherein an edge cloud server located close to both the first terminal device and the second terminal device executes the application backend as the backend server.

6. The method according to claim 5, wherein the transaction application is operated using a cellular network as the communication network, wherein the edge cloud server is located close to a radio cell of the cellular network, and wherein the first terminal device and the second terminal device are arranged in the cellular network.

7. The method according to claim 1, wherein a quality service of the communication network applies a respective predetermined service quality to the first connection and/or the second connection.

8. The method according to claim 7, wherein the predetermined service quality is applied dependent on a subscriber identity provided by a subscriber identity module of the first terminal device and/or the second terminal device.

9. The method according to claim 7, wherein the respective predetermined service quality is applied dependent of a unique quality identifier provided by the first application frontend and/or the second application frontend.

10. The method according to claim 9, wherein the predetermined service quality is applied dependent on a transaction application ID of the transaction application, an access point name/data network name or a combination comprising an IP address and a port number as the unique quality identifier.

11. The method according to claim 9, wherein:

the first application frontend stores the unique quality identifier; and/or the second application frontend stores the unique quality identifier; and/or the first application frontend causes the application backend to generate the unique quality identifier and to transmit the generated unique quality identifier to the second application frontend.

12. The method according to claim 1, wherein the second application frontend stores additional transaction data for completing the transaction and adds the additional transaction data to the transaction authorization and/or the first application frontend authenticates a user of the first terminal device.

13. A system for completing a transaction, comprising:

a first terminal device configured to execute a first application frontend of a transaction application, wherein the first terminal device corresponds to a dealer;

a second terminal device configured to execute a second application frontend of the transaction application, wherein the second terminal device corresponds to a customer;

a backend server configured to execute an application backend of the transaction application; and a communication network for connecting the first terminal device, the second terminal device and the backend server, wherein the communication network is connected to the first terminal device via a first connection, and wherein the communication network is connected to the second terminal device via a second connection;

wherein the first application frontend is configured to, for starting a transaction, transmit a transaction request to the application backend, wherein the transaction request indicates the transaction to be started, indicates the second application frontend, and comprising transaction data associated with the indicated transaction;

wherein the application backend is configured to, upon receipt of the transaction request, provide a transaction link for connecting the second application frontend to the application backend, wherein the transaction link comprises address data of the application backend, a unique transaction ID and/or further data for connecting to the application backend, wherein providing the transaction link comprises generating the transaction link and transmitting the transaction link to the first application frontend;

wherein the first application frontend is configured to, upon receipt of the transaction link, transfer the received transaction link to the second application frontend via a contactless, unidirectional short range transmission different from the first connection and the second connection;

wherein the application backend is configured to, upon being connected to by the second application frontend via the transaction link, transmit an authorization request to the second application frontend via the second connection;

wherein the second application frontend is configured to, upon receipt of the authorization request, authorize the requested transaction and transmit a transaction authorization to the application backend; and wherein the application backend is configured to, upon receipt of the transaction authorization, complete the transaction.

* * * * *